J. J. MORSE.
REINFORCED BRAKE SHOE.
APPLICATION FILED AUG. 19, 1912.
1,095,019.
Patented Apr. 28, 1914.
5 SHEETS—SHEET 1.
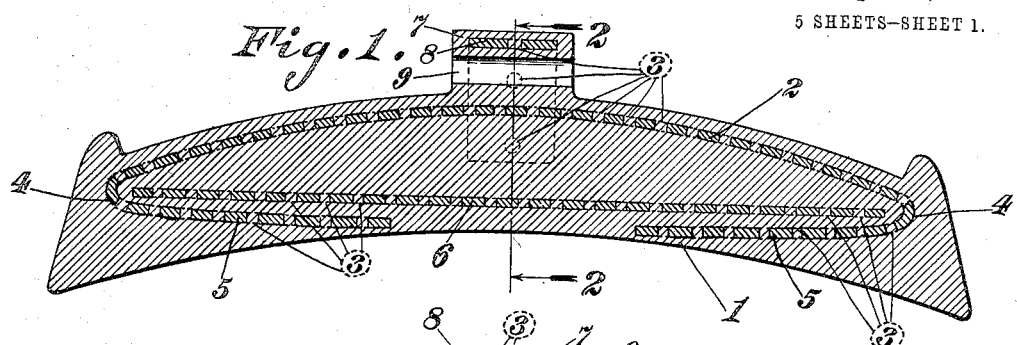
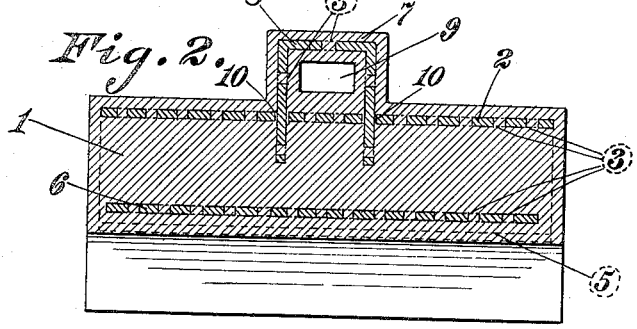
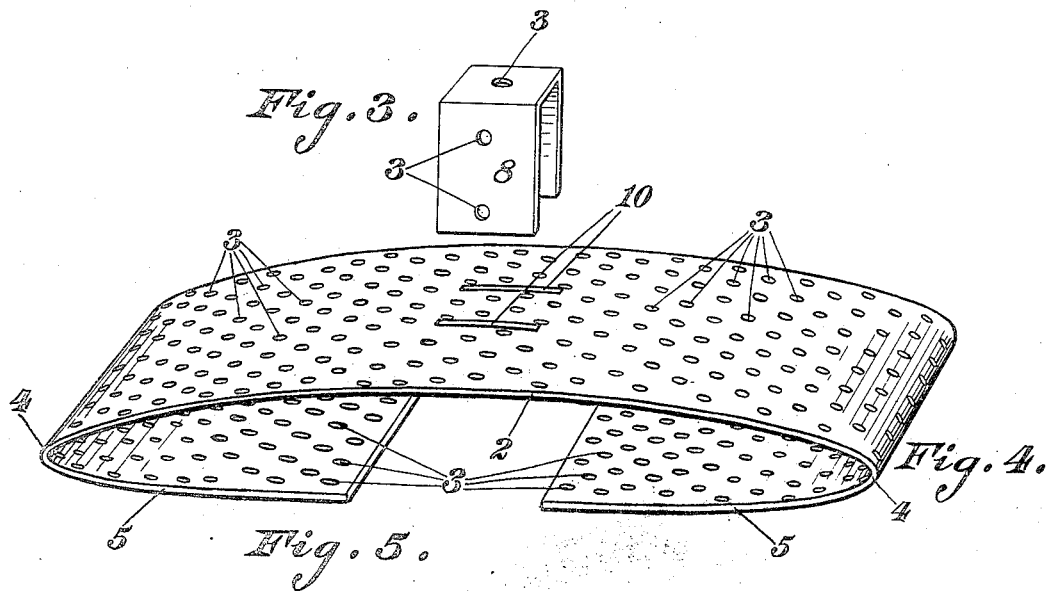
Witnesses:
Harry H. Reiss
George G. Anderson
Inventor:
John J. Morse,
By Hugh H. Wagner,
His Attorney.

J. J. MORSE.
REINFORCED BRAKE SHOE.
APPLICATION FILED AUG. 19, 1912.
1,095,019.
Patented Apr. 28, 1914.
5 SHEETS—SHEET 2.
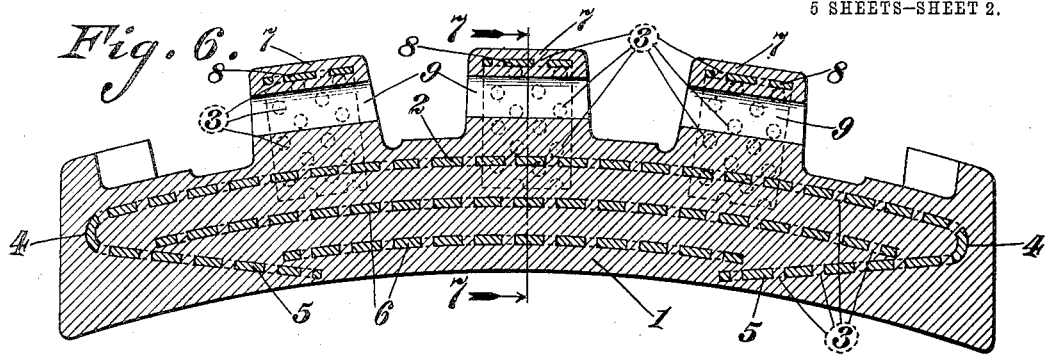
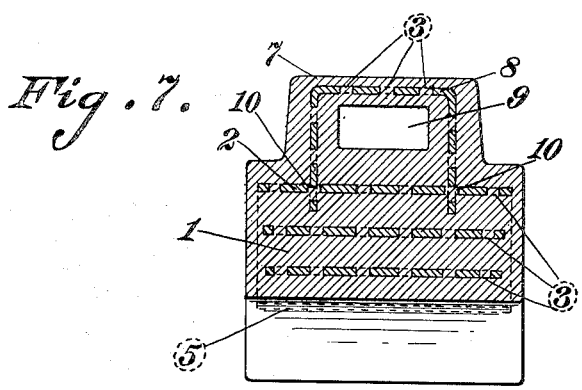
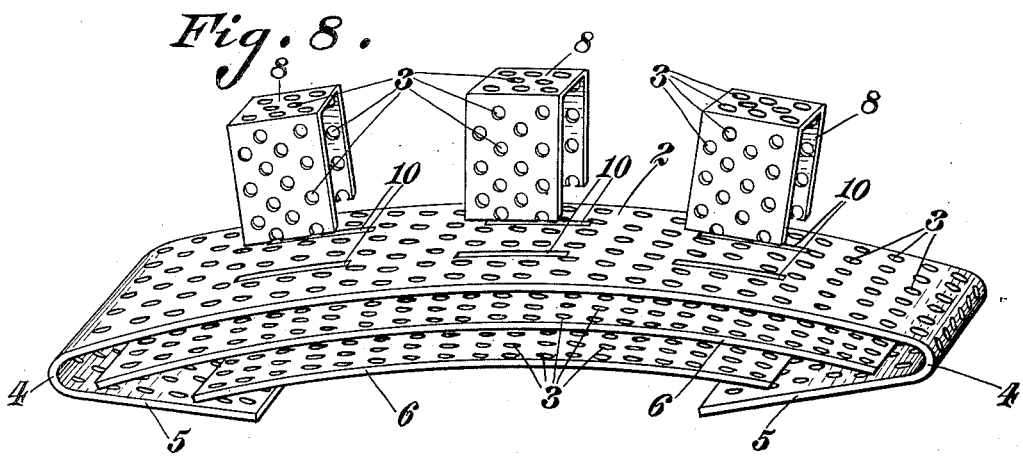
Witnesses:
Harry H. Reiss
George G. Anderson
Inventor:
John J. Morse,
By Hugh K. Wagner
His Attorney.

J. J. MORSE.
REINFORCED BRAKE SHOE.
APPLICATION FILED AUG. 19, 1912.
1,095,019.
Patented Apr. 28, 1914.
5 SHEETS—SHEET 3.
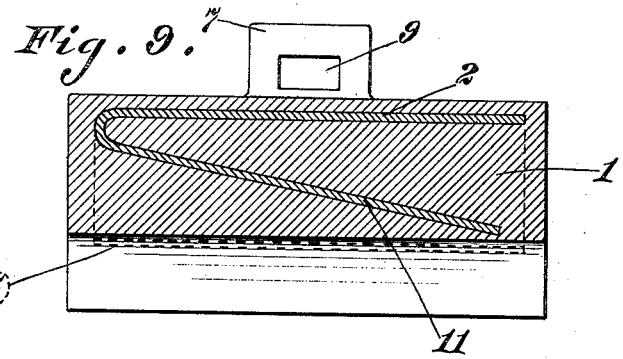
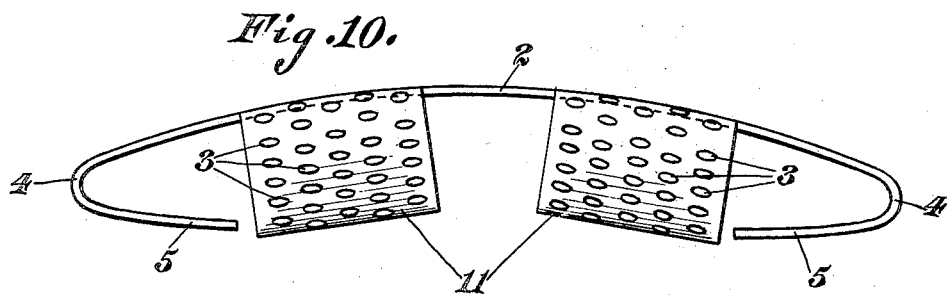
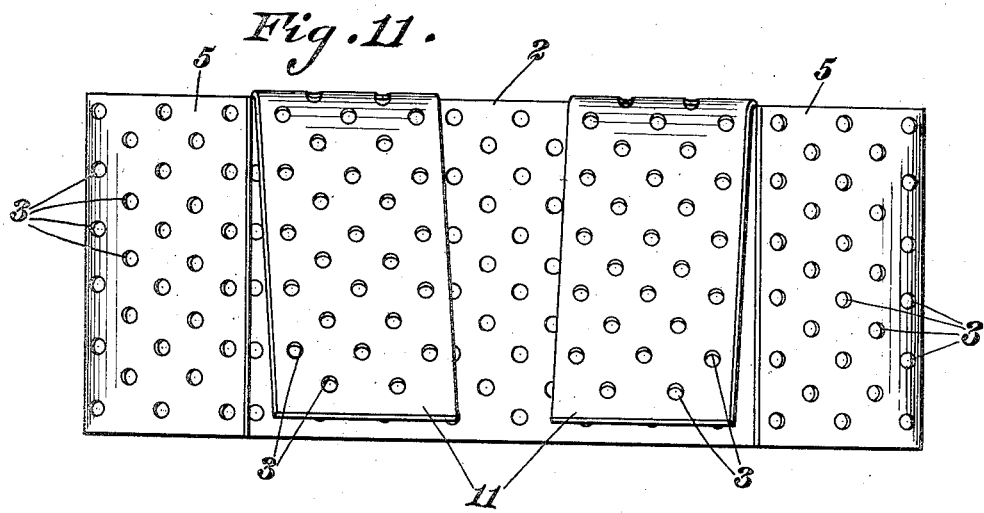

J. J. MORSE.
REINFORCED BRAKE SHOE.
APPLICATION FILED AUG. 19, 1912.
1,095,019.
Patented Apr. 28, 1914.
5 SHEETS—SHEET 4.
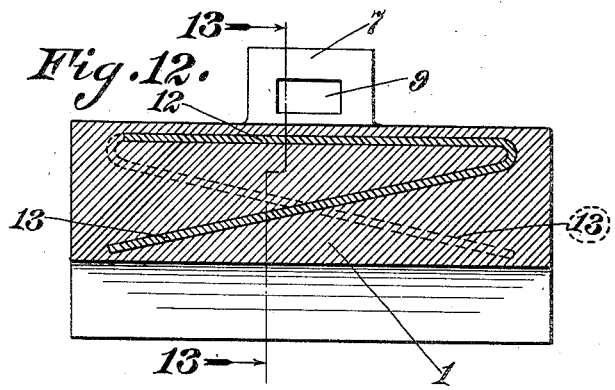
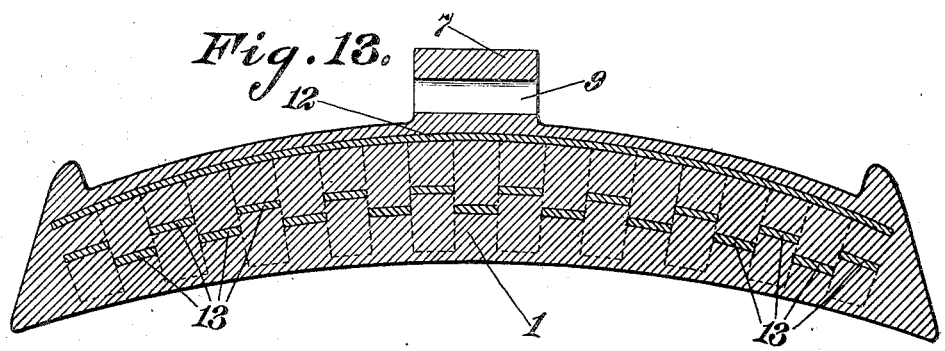
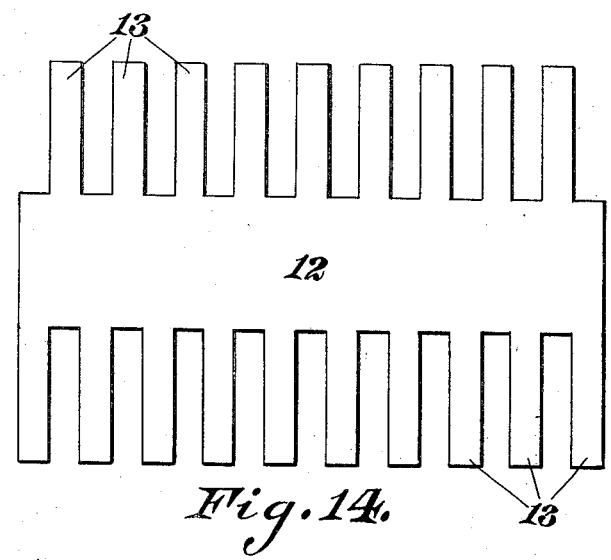

J. J. MORSE.
REINFORCED BRAKE SHOE.
APPLICATION FILED AUG. 19, 1912.
1,095,019.
Patented Apr. 28, 1914.
5 SHEETS—SHEET 5.
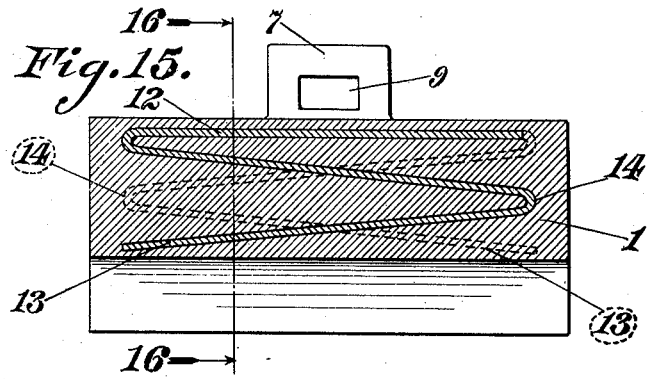
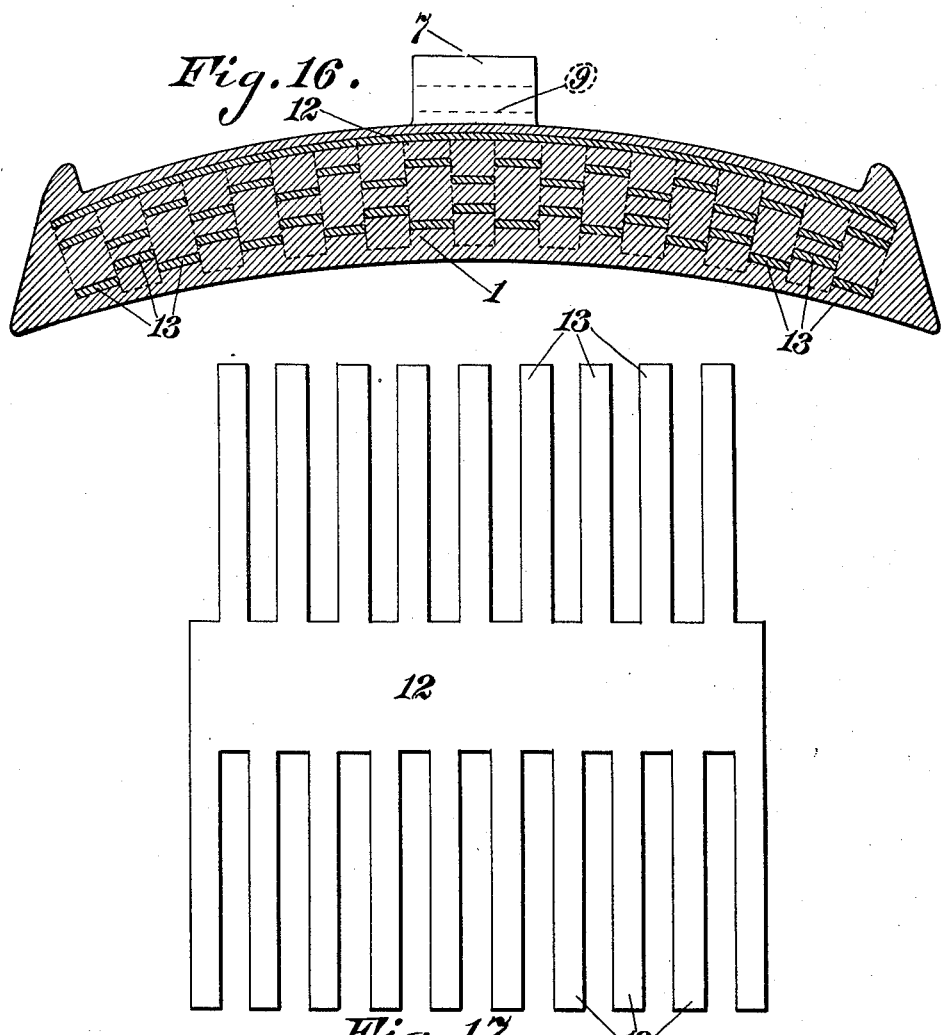

UNITED STATES PATENT OFFICE.

JOHN J. MORSE, OF ST. LOUIS, MISSOURI.

REINFORCED BRAKE-SHOE.

1,095,019.  Specification of Letters Patent.  Patented Apr. 28, 1914.

Application filed August 19, 1912. Serial No. 715,707.

*To all whom it may concern:*

Be it known that I, JOHN J. MORSE, a citizen of the United States, residing at the city of St. Louis, State of Missouri, have invented certain new and useful Improvements in Reinforced Brake-Shoes, of which the following is a specification.

This invention relates to new and useful improvements in brake-shoes, and has for its object to provide a brake-shoe which is composed of relatively hard and soft metals in order to obtain increased frictional and wearing qualities and at the same time to increase the strength and longevity of the brake-shoe.

In the accompanying drawings forming part of this specification, in which like numbers of reference denote like parts wherever they occur, Figure 1 is a longitudinal sectional view of an improved brake-shoe embodying the present invention; Fig. 2 is a transverse sectional view on the line 2—2, Fig. 1; Figs. 3, 4, and 5 are perspective views of the reinforcing elements; Fig. 6 is a longitudinal sectional view of a brake-shoe embodying an alternate form of the present invention; Fig. 7 is a transverse sectional view on the line 7—7, Fig. 6; Fig. 8 is a perspective skeleton view of the reinforcing elements, which are used in the structure depicted in Figs. 6 and 7; Fig. 9 is a transverse sectional view of a brake-shoe having an alternate form of reinforcing elements located therein; Figs. 10 and 11 are side and front views, respectively, of this reinforcing element; Fig. 12 is a transverse sectional view of a brake-shoe having an alternate form of reinforcing element located therein; Fig. 13 is a longitudinal sectional view on the line 13—13, Fig. 12; Fig. 14 is a plan view of the pattern of the reinforcing element, which is used in the structure depicted in Figs. 12 and 13; Fig. 15 is a transverse sectional view of a brake-shoe having an alternate form of reinforcing element located therein; Fig. 16 is a longitudinal sectional view on the line 16—16, Fig. 15; and, Fig. 17 is a plan view of the pattern of the reinforcing element, which is used in the structure depicted in Figs. 15 and 16.

In the drawings, the brake-shoe is designated 1 and is preferably formed of cast-iron. The brake-shoe is reinforced by a plate 2 of wrought, ductile, or other tough metal, which plate is preferably located near the back of the brake-shoe and is arcuated similarly to the back of the brake-shoe, being provided with perforations 3 so that the cast metal fills same and thereby holds the plate firmly in the body of the brake-shoe. Adjacent the ends of the brake-shoe 1, the plate 2 is bent at the points 4 so that the end portions 5 thereof extend toward the wearing face of the brake-shoe. Located within the body of the brake-shoe 1 and extending between the end portions 5 of the plate 2 is a plate 6 or a plurality of such plates, said plate or plates 6 being, also, provided with perforations 3 so as to be held firmly in the body of the brake-shoe by the cast metal that fills said perforations. The plate or plates 6 may be either straight as depicted in Fig. 1, or arcuated as depicted in Fig. 6, and, when two or more plates 6 are used, same are preferably of different lengths, the shortest being located nearest the wearing face of the brake-shoe, the next longer near the shortest, and so on toward the back of the brake-shoe. The perforations 3 may be arranged in either a regular or an irregular manner in the plates 2 and 6, and by reason of the provision of same particularly in the plate or plates 6 and the end portions 5 of the plate 2, the frictional qualities of the wearing portion of the brake-shoe are greatly enhanced, due to the brake-shoe being composed of the relatively hard wrought or ductile metal of said plates and the relatively soft cast-metal of the brake-shoe, and the strength and longevity of the brake-shoe are greatly increased.

The brake-shoe may be provided with the usual key lug 7 as depicted in Fig. 1, or a plurality of such key lugs as depicted in Fig. 6. Each lug 7 may be reinforced by means of a U-shaped plate 8, which is so located in said lug that same straddles the opening 9 therein, and the ends of same extend through slots 10 in the plate 2 into the body of the brake-shoe so as to be anchored firmly in the cast-metal in the body of the shoe. Said plate 8 is, also, provided with perforations 3 so that the cast-metal will run into and fill same and thereby hold said plate firmly in place in the lug 7. By this arrangement each key lug 7 is greatly strengthened and is prevented from being broken in use.

If desired, the plate 2 may be provided with a relatively wide extension or tongue 11 or a plurality of such extensions or tongues as depicted in Figs. 9, 10, and 11, in which case the plate or plates 6 may be omitted entirely. In the structure depicted in these figures, the plate 2 is provided with a pair of extensions 11, which extensions project from one side of said plate and extend diagonally through the body of the brake-shoe toward the wearing face of the latter adjacent the other side of the brake-shoe, being, also, provided with perforations 3, so that the cast-metal will run into and fill said perforations, whereby the extensions 11 will be held firmly in place in the cast-metal and together with the cast-metal will increase the frictional qualities of the wearing part of the brake-shoe. It should be understood that the plate 2 may be provided with only one extension 11, if so desired, and, furthermore, that when the plate 2 is provided with more than one extension 11, all of the extensions may project from one side of the plate 2, or, if desired, each side of said plate may bear an extension 11 or a plurality of such extensions.

In an alternate form of the invention depicted in Figs. 12 to 17, inclusive, the plate 2 and the plate or plates 6 are omitted entirely, and a plate 12 is substituted in lieu thereof, which plate 12, while it is preferably free from perforations 3 as illustrated in the drawings, may be provided with such perforations, if so desired. The plate 12 is located near the back of the brake-shoe 1, and bears a plurality of arms 13, some of which arms project from one side of said plate and others project from the opposite side of said plate, the arms 13 borne by one side of the plate 12 being spaced apart and arranged in staggered relation with respect to the arms 13, which are borne by the other side of said plate and are, also, spaced apart, as best seen in the patterns of said plate depicted in Figs. 14 and 17. The arms 13 are bent so as to extend diagonally through the body of the brake-shoe from opposite sides of the plate 12 so that the arms 13 borne by one side of said plate extend between the arms 13 borne by the other side of said plate, and by this arrangement not only anchor the plate 12 firmly in the cast-metal of the brake-shoe, but increase the frictional qualities of the wearing part of the brake-shoe. Said arms 13 may be of such length that same will extend substantially straight from the side of the plate 12 diagonally through the body of the brake-shoe to a point near the wearing face of the brake-shoe, as depicted in Figs. 12 and 13, or if desired said arms may be relatively long, in which case each arm 13 is bent at the point 14 intermediate the end of said arm and its point of juncture with the plate 12, so that the part extending between the bend 14 and the point of juncture with the plate 12 diverges toward said plate, and the part extending from the bend 14 to the end of said arm diverges toward the wearing face of the brake-shoe as depicted in Figs. 15 and 16. It should be understood that, if desired, the arms 13 may be still longer and provided with more bends 14 than shown in Figs. 15 and 16.

It will be evident that the wrought or ductile reinforcing plates not only increase the strength of the brake-shoe, but the presence of same in the wearing part of the brake-shoe enhances its braking qualities and thereby increases the longevity of the brake-shoe. By reason of using a plate or a plurality of plates having perforations 3 formed therein or bearing extensions 11 or arms 13 as hereinabove described, the disposition and area of the wrought or ductile metal with relation to the cast metal in the wearing part of the brake-shoe change constantly as the braking face of the brake-shoe wears away in use, and in this way prevents the braking face of the brake-shoe from wearing the tread of the wheel unevenly.

One of the great advantages in the construction of the reinforced brake-shoe of the present invention resides in the use of a back plate having its ends or other parts thereof bent, so that same may not only extend into and form part of the wearing face of the brake-shoe, but may take the place of the inserts ordinarily used. In this way the plate at or adjacent to the back of the brake-shoe is combined with the parts of same that may take the place of inserts in the wearing part of the brake-shoe, the result being the provision of a stronger and more efficient brake-shoe.

I claim:

1. A reinforced brake-shoe composed of cast-metal and having a perforated plate of metal located adjacent to the back thereof, the end portions of said plate being bent inwardly adjacent to the ends of the brake-shoe so as to extend toward each other and into the wearing part of the brake-shoe.

2. A reinforced brake-shoe composed of cast-metal and having a perforated plate of metal located adjacent to the back thereof and a perforated plate of metal located adjacent to the wearing face of the brake-shoe, the end portions of said first-mentioned plate being bent inwardly adjacent to the ends of the brake-shoe so as to extend into the wearing part of the brake-shoe.

3. A reinforced brake-shoe composed of cast-metal and having a perforated plate of metal located adjacent to the back thereof, the end portions of said plate being bent inwardly at or adjacent to the ends of the brake-shoe so as to extend into the wearing part of the brake-shoe, and a plurality of perforated plates of metal located intermediate said first-mentioned plate and the wearing face of the brake-shoe.

4. In a brake-shoe, a shoe proper and a pair of spaced metal plates embedded in the shoe, the ends of one of the plates being bent inwardly to inclose the ends of the other plate.

5. In a brake-shoe, a shoe proper and a plurality of spaced metal plates embedded in the shoe, the ends of an outermost plate being bent inwardly to inclose the ends of the remaining plates.

6. A reinforced brake-shoe having a plate disposed adjacent to the back thereof and having its ends bent inwardly toward each other in spaced relation and extending into the wearing part of the brake-shoe and a second plate which bridges the space between said ends of the first mentioned plate.

7. A reinforced brake-shoe having a plate disposed adjacent to the back thereof and having its ends bent inwardly toward each other in spaced relation and extending into the wearing part of the brake-shoe, and a plurality of superposed plates which bridge the space between said ends of the first mentioned plate and are disposed between the body of the latter and its said ends.

8. A reinforced brake-shoe having a plate located adjacent to the back thereof and having parts of same adjacent to the marginal edges of the brake-shoe bent inwardly so that each of the parts extends from side to side of the brake-shoe and into the wearing part of said brake-shoe.

In testimony whereof I hereunto affix my signature in the presence of two witnesses.

JOHN J. MORSE.

Witnesses:
GEORGE G. ANDERSON,
WALTER C. GUELS.